Dec. 3, 1963
B. A. SOBIN ETAL
3,113,074
ANTIMICROBIAL AGENT
Filed Jan. 10, 1956
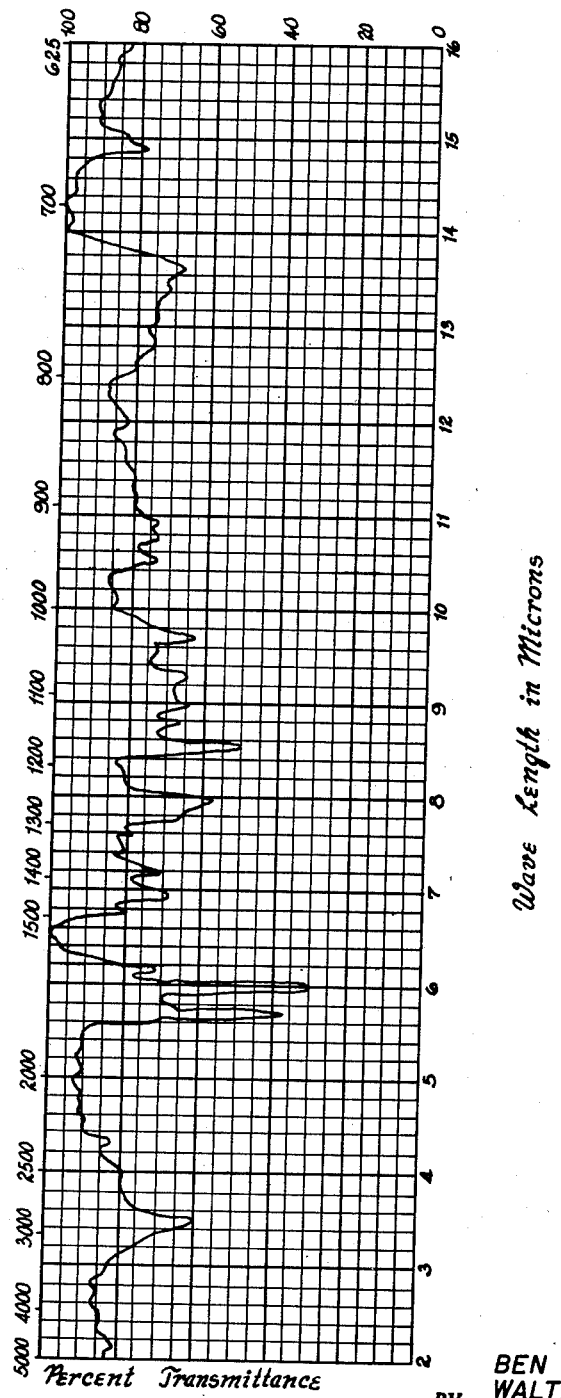
INVENTORS
BEN A. SOBIN
WALTER D. CELMER
BILLIE K. KOE
BY Connolly and Hutz
Their Attorneys

United States Patent Office 3,113,074
Patented Dec. 3, 1963

3,113,074
ANTIMICROBIAL AGENT
Ben A. Sobin, Garden City, Walter D. Celmer, Manhasset, and Billie K. Koe, Woodside, N.Y., assignors to Chas. Pfizer & Co., Inc., New York, N.Y., a corporation of Delaware
Filed Jan. 10, 1956, Ser. No. 558,329
9 Claims. (Cl. 167—65)

This invention relates to a new and useful antibiotic called P.A. 132, and more particularly, to its production by fermentation, to methods for its recovery and concentration from crude solutions, such as fermentation broths, to processes for its purification, and to methods for the preparation of its salts. The invention includes within its scope the antibiotic in dilute form, as crude concentrates and in pure crystalline forms. These novel products are useful in combating pathogenic microorganisms, especially the fungi. They are particularly useful in protecting plants and seeds against phytopathogens, including pathogenic fungi which are responsible for a variety of diseases in the agricultural field.

The new antibiotic is formed during the cultivation under controlled conditions, of a new species of microorganism which has been designated as *Streptomyces roseogriseus* sp. nov. by Dr. John B. Routien, who studied the cultural characteristics of the microorganism by planting a culture thereof on media normally used for the identification of actinomycetes. A culture of the microorganism has been deposited with the American Type Culture Collection, Washington, D.C., and added to its collection of microorganisms as ATCC 12414. That deposited culture constitutes the type culture for this new species. The classification of this new species, designated Isolate No. 18330–4, in the culture collection of Chas. Pfizer & Co., Inc. of Brooklyn, N.Y. was made by comparing the various characteristics of the microorganism with the Streptomyces described in Waksman and Lechevalier's "Actinomycetes and Their Antibiotics."

The cultural characteristics of *S. roseogriseus* are set forth in the following table. The results are based upon six replications or slants or Petri dishes incubated under standard conditions of temperature and humidity for a period of two weeks. The colors where "R" is written are those of Ridgway, "Color Standards and Nomenclature."

TABLE I

*S. roseogriseus* ATCC No. 12414

| Medium | Amount of Growth | Aerial Mycelium and Sporulation | Soluble Pigment | Remarks |
|---|---|---|---|---|
| Glucose Asparagine Agar | Poor to moderate on spot plates, good on streak plates. | Spare to moderate on spot plates; in center, white to creamy white; on streak plates aerial mycelium good, light gray [between Pale Drab-Gray and Pale Mouse Gray (R)]. | None on spot plates; pinkish-tan [near Vinaceous Cinnamon (R)] on streak plates. | On spot plates, vegetative mycelium cream color where visable, colonies raised, reverse creamy white to pinkish-buff to yellow-brown; on streak plates no vegetative mycelium visible, reverse brown [Antique Brown (R) to darker than Antique Brown (R)]; conidiophores terminal and branching; conidia in long, straight or slightly wavy chains which are borne mostly in pairs; spores broadly elliptical to short cylindric, 0.65 x 1.00–1.30. On dilution plates colonies essentially alike—aerial mycelium white to light mouse gray, reverse yellow-brown to rich brown. |
| Skimmed Milk | Poor to moderate | Sparse, mostly on surface of glass, creamy white; ring creamy white to brownish-yellow [Buckthorn Brown (R) to Ochraceous-Tawny (R)] in half of tubes (with coagulation); brownish-yellow to brown in rest of tubes [Buckthorn Brown (R) to darker than Brussels Brown (R)]. | Essentially none in tubes with coagulation, brownish-gray [similar to Buffy Brown (R)] in rest of tubes. | Half of tubes coagulated, pH changed from 6.3 to 4.8; rest of tubes with no coagulation, peptonization or hydrolysis, pH changed from 6.3 to 5.8. |
| Glucose Agar | Poor | Very sparse at upper edge of slant, creamy white. | Dark Brown | Surface waxy and convoluted to merulioid; margin smooth, becoming radially convoluted at base of slant; vegetative mycelium and reverse buff [near Warm Buff (R)]. |
| Nutrient Agar | Poor to moderate | Sparse to moderate, white | Tan | No vegetative mycelium visible; reverse buff. |
| Synthetic Agar | Good | Sparse or moderate, creamy white to pale tan [near Ecru-Drab (R) to near Light Vinaceous-Fawn (R)]. | Yellowish to yellow-pink [similar to Vinaceous-Cinnamon (R)]: after 6–7 wks. peach-orange to rust-orange at base of 3 slants. | No subsurface growth; vegetative mycelium yellowish to yellow-brown [Chamois (R) to Ochraceous Tawny (r) to Tawny (R)]; reverse creamy white to yellow to cinnamon [Yellow Ocher (R) to Tawny (R)]. |
| Calcium Malate Agar | do | Good, white to tan [Avellaneous (R) to Wood Brown (R)]. | Essentially none | Malate digested; no vegetative mycelium visible; reverse white to tan [Pinkish Buff (R)]. |
| Cellulose | do | Light gray [Light Cinnamon-Drab (R) to near Mouse Gray (R)]. | None | Vegetative mycelium (reverse) pale pink to bright yellow [Primuline Yellow (R)]. |
| Potato Slants | do | Sparse or moderate to good, white to tan [between Avellaneous (R) and Wood Brown (R)]. | Tan to blackish-gray [Avellaneous (R) or near Drab (R) to Blackish Brown (3) (R)]. | Surface convoluted to merulioid; margin frequently lichenoid; vegetative mycelium almost same color as soluble pigment; odor acid-earthy. |
| Starch plates | Moderate | Moderate to good, pale tan to light gray [Drab-Gray (R) to Pale Mouse Gray (R)]. | None | No starch hydrolysis, reverse white; colonies almost flat; spot plates with several or many droplets of clear colorless secretion; no vegetative mycelium visible. |
| Gelatin Plates | Moderate to good | Sparse to moderate on spot plates, sparse and scattered on streak plates, grayish-white or white. | Bright olive-yellow or brownish-yellow to dark brown. | Liquefaction slight, vegetative mycelium brownish. |
| Dextrose Nitrate Broth | Good | Moderate to good, white to pale tan or pale gray [Ecru-Drab (R)]. | None | Nitrate reduction none or slight; vegetative mycelium white to creamy yellow. |

TABLE I—Continued

| Medium | Amount of Growth | Aerial Mycelium and Sporulation | Soluble Pigment | Remarks |
|---|---|---|---|---|
| Emerson Agar | Good | Moderate to good except sparse at base, pale brownish-gray [similar to Ecru-Drab (R)]. | Slightly lighter than in Glucose Agar. | Surface shallowly convoluted to shallowly merulioid becoming slightly fissured at base; basal margin radially convoluted and waxy; vegetative mycelium colorless to tan; reverse cinnamon [between Zinc Orange (R) and Orange-Cinnamon (R)]. |

It is to be understood that for the production of P.A. 132 the present invention is not limited to this particular organism or to organisms fully answering the above description, which is given only for illustrative purposes. In fact, it is especially desired and intended to include the use of mutants produced from the described organism by various means, such as X-radiation, ultraviolet radiation, nitrogen mustard treatment, and the like.

As previously pointed out, antibiotic P.A. 132 shows a high order of activity against a variety of fungi. While it demonstrates some activity against Gram-negative and Gram-positive microorganisms, this activity is generally of a somewhat lower level. The following table illustrates the antibiotic spectrum of P.A. 132 against a variety of Gram-negative, Gram-positive microorganisms, fungi and mycobacteria. These tests were run by seeding nutrient broth containing various concentrations of the pure antibiotic with the particular organism specified. The "minimum inhibitory concentration" indicated in Table II is the minimum concentration of the antibiotic (in micrograms/milliliter) at which growth of the microorganisms failed to occur. Since the highest concentration employed in this test was 100 mcg./ml., the "minimum inhibitory concentration" is not precisely stated where such concentrations apparently exceed 100 mcg./ml. The test was conducted under standardized conditions.

TABLE II

*Spectrum of P.A. 132 (Benzylamine Salt)*

| Organism | Minimum Inhibitory Concentration P.A. 132; mcg./ml. |
|---|---|
| Micrococcus pyogenes var. aureus #5 | 6.25 |
| Streptococcus pyogenes #8668 | <0.19 |
| Streptococcus faecalis A 121 | 12.5 |
| Diplococcus pneumoniae I | <0.19 |
| Erysipelothrix rhusiopathiae | 0.78 |
| Corynebacterium diphtheriae | 0.78 |
| Listeria monocytogens | 50 |
| Bacillus subtilis | 6.25 pi |
| Micrococcus pyogenes var. aureus #376 | 12.5 |
| Micrococcus pyogenes var. aureus M/r | 25 |
| Micrococcus pyogenes var. aureus P/r | 12.5 |
| Mayo 400 | 25 |
| Mayo 2870 | 12.5 pi |
| Mayo 2871 | 25 pi |
| Aerobacter aerogenes | 50 |
| Escherichia coli | 3.12 |
| Proteus vulgaris | 50 pi |
| Pseudomonas aeruginosa | >100 |
| Salmonella typhosa | 3.12 |
| Klebsiella pneumoniae | 6.25 |
| Nesseria gonorrheae | >100 |
| Hemophilus influenzae | 12.5 |
| Shigella sonnei | 12.5 |
| Candida albicans | >100 |
| Bacterium ammoniagenes | >100 |
| Saccharomyces cerevisiae | >100 |
| Erwinia amylovora | 6.25 |
| Phytomonas tumefaciens | <0.19 |
| Brucella bronchiseptica | >100 |
| Malleomyces mallei | >100 |
| Clostridium perfringens | <0.19 |
| Lactobacillus casei | 50 |
| Desulfovibrio desulfuricans | >100 |
| Mycobacterium 607 | >100 |
| Mycobacterium berolinense | >100 |
| Pityrosporum ovale | 50 |
| Vibrio | >100 |

In the foregoing table "M/r" indicates a Magnamycin (carbomycin-resistant organism and "P/r" indicates a penicillin-resistant organism. The antifungal spectrum of P.A. 132 is more particularly illustrated in Table III wherein "+" indicates growth and "—" indicates no growth of the test organism at the concentration of antibiotic employed. The designation "pi" indicates partial inhibition of growth.

TABLE III

*P.A. 132 Spectrum, Additional Fungi*

| Organism | Concentration P.A. 132; Mcg./ml. | | | | |
|---|---|---|---|---|---|
| | 500 | 100 | 50 | 10 | 1 |
| Pathogens: | | | | | |
| Histoplasma capsulatum | — | — | + | + | + |
| Blastomyces brasiliensis | + | + | + | + | + |
| Blastomyces dermatitidis | + | + | + | + | + |
| Trichophyton sulfureum | + | + | + | + | + |
| Trichophyton violaceum | + | + | + | + | + |
| Sporotrichum schenckii | + | + | + | + | + |
| Hormodendrum compactum | + | + | + | + | + |
| Cryptococcus neoformans | + | + | + | + | + |
| Phialophora verrucosa | + | + | + | + | + |
| Pityrosporum ovale | + | + | + | + | + |
| Candida albicans 8 | + | + | + | + | + |
| Candida albicans 9 | + | + | + | + | + |
| Candida albicans 11 | + | + | + | + | + |
| Candida albicans 13 | + | + | + | + | + |
| Candida albicans "C" | + | + | + | + | + |
| Epidermophyton floccosum | — | — | — | — | — |
| Microsporum audouini | — | — | — | — | — |
| Trichyphyton rubrum | + | + | + | + | + |
| Phytopathogens: | | | | | |
| Alternaria solani | — | — | — | — | + |
| Botrytis allii | — | — | — | + | + |
| Septoria nodorum | — | — | — | — | — |
| Endothia parasitica | — | — | pi | pi | pi |
| Neocosmospora vasinfacta | — | — | + | + | + |
| Fusarium oxysporium | — | — | — | — | — |
| Nematospora coryli | — | — | — | — | pi |
| Ceratostomella ulmi (Ophiostoma) | — | — | — | + | + |
| Sclerotinia fructicola | — | — | — | — | + |
| Colletotrichum circinans | — | — | — | + | + |
| Verticillium albo-atrum | — | — | — | — | + |
| Physalospora malorum | — | — | — | pi | + |
| Helminthosporium victoriae | — | — | — | pi | pi |
| Hormodendrum resiniae | — | — | — | pi | + |
| Glomerella cingulata | — | — | — | — | + |
| Phoma betae | — | — | — | — | + |
| Fusarium lycopersici var. bulbigenum | — | pi | + | + | + |
| Diplodia zeae | — | — | — | pi | + |
| Rhizoctonia solani | — | — | — | — | + |
| Phythium debaryanum | — | — | — | + | + |
| Helminthosporium terricium | — | — | — | + | + |
| Mycogone perniciosa | — | — | — | — | + |
| Penicillium sp. marathon #7 | — | — | — | pi | + |
| Saprophtes: | | | | | |
| Rhizopus nigricans | — | + | pi | + | + |
| Penicillium steckii | — | + | + | + | + |
| Aspergillus niger | — | + | pi | + | + |
| Penicillium frequentans | — | + | + | + | + |
| Penicillium citrinum | — | + | + | + | + |
| Penicillium funiculosum | — | + | + | + | + |
| Aspergillus nidulans | — | + | + | + | + |
| Penicillium soppi | — | + | + | + | + |
| Aspergillus terreus | — | + | + | + | + |
| Aspergillus fumigatus | + | + | + | + | + |
| Paecilomyces varioti | + | + | + | + | + |
| Aspergillus flavus-oryzae | + | + | + | + | + |
| Hormodendron sp. (Wehmyer) | — | — | + | + | + |
| Mucor mucedo | — | — | — | — | + |
| Penicillium oxalicum | — | + | + | + | + |
| Saccharomyces cerevisiae | — | — | — | — | — |
| Schizosaccharomyces octosporus | pi | pi | + | + | + |
| Pullularia pullulans | — | — | — | pi | + |
| Byssochlamys fulva | + | + | + | + | + |
| Cladosporium herbarum | — | — | — | — | — |
| Cladosporium (Hormodendun) cladosporoides | — | — | + | + | + |
| Endomyces fibuliger | + | + | + | + | + |
| Margarinomyces bubaki | + | + | + | + | + |
| Oospora lactis | — | — | — | — | — |
| Penicillium digitatum | — | + | + | + | + |

As will be seen from the results set forth in Table III, of the three classes of fungi tested, P.A. 132 was most highly active against the phytopathogens.

P.A. 132 has also been found to be active in vitro against the protozoa, as illustrated by the results set forth in Table IV.

TABLE IV

*P.A. 132 Spectrum, Protozoa*

| Organism | Minimum Inhibitory Concentration, P.A. 132, mcg./ml. |
| --- | --- |
| Trichomonas vaginalis | 0.09 |
| Endamoeba histolytica | 6.2 |

Antibiotic P.A. 132 has been found to possess a relatively low level of toxicity when applied to the skin of rabbits, which suggests the possibility of using it topically in combating microorganisms sensitive thereto. It does, however, offer more promise as a highly useful agent in combatting various plant pathogens.

The invention includes within its scope a process for growing the microorganism, *S. roseogriseus*. The cultivation of this microorganism preferably takes place in aqueous nutrient media at a temperature of about 24–30° C., and under submerged conditions of agitation and aeration. Nutrient media which are useful for this purpose include a carbohydrate, such as sugars, starch, glycerol, corn meal, and a source of organic nitrogen, such as casein, soybean meal, peanut meal, wheat gluten, cottenseed meal, lactalbumin, enzymatic digest of casein, tryptone. A source of growth substances, such as distillers' solubles, yeast extract, molasses fermentation residues, as well as mineral salts, such as sodium chloride, potassium phosphate, sodium nitrate, magnesium sulfate and trace minerals such as copper, zinc and iron may also be utilized with desirable results. If excessive foaming is encountered during the fermentation, anti-foaming agents, such as vegetable oils, may be added to the fermentation medium. The pH of the fermentation tends to remain rather constant, but if variations are encountered, a buffering agent, such as calcium carbonate may also be added to the medium.

Inoculum for the preparation of antibiotic P.A. 132 by the growth of *S. roseorgriseus* may be obtained by employing growth from slants on such media as Emerson's agar or beef lactose. The growth may be used to inoculate either shaken flasks or inoculum tanks for submerged growth, or, alternatively, the inoculum tanks may be seeded from the shaken flasks. The growth of the microorganism usually reaches its maximum in about two or three days. However, variations in the equipment, the rate of aeration, rate of stirring and so forth may affect the speed with which the maximum activity is reached. In general, from about 24 hours to four days is a desirable period for producing the antibiotic. Aeration of the medium in tanks for submerged growth is maintained at the rate of about one-half to two volumes of free air per volume of broth per minute. Agitation may be maintained by suitable types of agitators generally familiar to those in the fermentation industry. Aseptic conditions must, of course, be maintained throughout the transfer of the inoculum and throughout the growth of the microorganism.

After growth of the microorganism, the mycelium, which is generally quite luxuriant and fine, may be removed from the fermentation broth by various standard pieces of equipment, such as filter-presses, centrifuges, and so forth. Antibiotic P.A. 132 may be recovered from the fermentation broth by several different procedures. Alternatively, the whole broth may be used as is or it may be dried. The antibiotic may be further purified by various means; for instance, the compound may be extracted from aqueous solution at acidic pH conditions, preferably between about 2 to 3, by means of a variety of water-immiscible organic solvents, including ethers, aromatic hydrocarbons, esters, ketones, lower alcohols and halogenated hydrocarbons. Examples of these are diethyl ether, benzene, toluene, ethyl acetate, butyl acetate, methyl isobutyl ketone, butanol, and chloroform. The antibiotic may be extracted from most solvent solutions back into water under substantially neutral pH conditions, or it may be extracted from such solvent solutions into pH 7 buffers. If desired, the solvent extract may be concentrated before extraction into water or buffers as described. By adjustment of the pH to between about 2 and 3, the antibiotic can be re-extracted into one of the solvents indicated above. Upon drying the solvent and concentrating the solution, the antibiotic is obtained as a tan-colored hydroscopic solid in crude form. The antibiotic may be further purified by countercurrent distribution in a solvent system composed of 60% aqueous methanol and toluene. Further methods of recovery which suggest themselves include absorption on charcoal with subsequent elution, treatment with ion exchange resins, and development on alumina columns.

Useful salts of antibiotic P.A. 132 may be prepared by treatment of the antibiotic with an organic base, such as primary, secondary and tertiary amines. The following compounds are illustrative of such bases: triethyl amine, procaine, benzylamine, dibenzylamine, dibenzylethylene diamine, and the like. Such bases may be used for recovering the antibiotic in purified form, after recovery of a crude material by one of the methods previously described. For example, the crude acid may first be recovered by extracting the filtered fermentation broth at pH 2.5 with chloroform and chromatographing the solvent extracts on a column of alumina. By developing the column with chloroform and methanol or benzene and methanol, the P.A. 132 free acid may be recovered in crude form. When this product is dissolved in a suitable solvent such as ether and treated with ether containing benzylamine, the benzylamine salt of P.A. 132 precipitates and may be recovered and dried. This product may be further purified by incorporating it into a suitable solvent system such as methanol-water, and adjusting the pH of the solution to acidic conditions, say to pH 2.5, to produce a purified form of the free acid of P.A. 132 which may again be extracted with an organic solvent such as ether. Treatment of this ether solution with further benzylamine yields a purified benzylamine salt of P.A. 132.

Antibiotic P.A. 132 is an acidic, white, amorphous organic compound that is soluble in dilute, aqueous alkaline solution and moderately soluble in water. It is very soluble in a number of organic solvents, such as methanol, ethanol, acetone, butanol, carbontetrachloride, and in general, in esters, ketones and halogenated hydrocarbons. It is insoluble in hexane. It is stable in a dry state or dissolved in anhydrous solvents. Salts of the antibiotic are stable in water under neutral to slightly acidic pH conditions. P.A. 132 is an optically active substance, having an $\alpha_D^{25} = -161°$ (c. 1%, methanol). P.A. 132 in methanol solution exhibits a peak in the ultraviolet region of the spectrum at about 218.5 mμ

$$E_{1\,cm.}^{1\%} 358$$

When dissolved in carbontetrachloride, the free acid exhibited the following characteristic absorption maxima which are set forth in reciprocal centimeters: 2857, 1764, 1684, 1629, 1484, 1445, 1397, 1316, 1263, 1176, 1143, 1119, 1079, 1034, 952, 930, 921, 834, 737 and 673. The infrared spectrum is more particularly illustrated in the accompanying drawing.

When a sample of the benzylamine salt of P.A. 132 was adjusted to pH 2.5 and extracted with ether, the resulting free acid of P.A. 132 was found to contain the following elements in the proportions by weight specified:

Carbon _____ 64.67
Hydrogen _____ 6.29
Oxygen (by difference) _____ 29.04

The neutral equivalent of P.A. 132 was found to be 300. Antibiotic P.A. 132 is clearly distinguished from other antibiotics by its properties, as evidenced by those properties described above and by paper chromatography measurements.

The invention is further illustrated by the following examples, which are not to be considered as imposing any limitation thereon. Indeed, as many apparently widely different embodiments of the present invention may be made without departing from the spirit or scope thereof, it is to be understood that the invention is only limited as defined in the appended claims.

EXAMPLE I

A slant of *S. roseogriseus* ATCC 12414 on Emerson agar was cultivated under controlled conditions to develop spores for the purpose of inoculating a nutrient medium of the following composition:

|  | Grams |
|---|---|
| "Cerelose" (dextrose hydrate) | 10 |
| Sodium chloride | 5 |
| "Curbay BG" (molasses residue) | 5 |
| Cornstarch | 10 |
| Soybean meal | 10 |
| Calcium carbonate | 1 |

This mixture of nutrients was diluted to a volume of one liter with water, adjusted to a pH of 7 with potassium hydroxide, and subjected to heat sterilization. Thereafter, the medium was cooled and the spores were added thereto under aseptic conditions. The cultivation of the organism was conducted in shaken flasks at about 25° C. for a period of two days. The mixture of broth and mycelium thus formed was then transferred to 20 times its volume of a sterile fermentation medium having substantially the same composition as indicated above and adapted for a larger scale fermentation. This medium was adjusted to pH 7 as previously described, sterilized in the usual manner, and the broth and mycelium previously prepared were then transferred thereto under aseptic conditions.

After seeding the medium with the organism from the shaken flasks, the mixture was subjected to agitation and aeration under sterile conditions for three days. The potency of the broth at this point was found to be 70 mcg./ml. The mycelium was removed by filtration and the broth was adjusted to pH 2 with 50% sulfuric acid. It was then extracted three times with one-fourth volume of chloroform, and the chloroform extracts were combined and washed twice with a small proportion of water, the water wash being discarded. Thereafter the chloroform phase was extracted with a 1% solution of sodium bicarbonate. The alkaline extract was then adjusted to pH 2 with sulfuric acid and further extracted with ether. The ether extract was concentrated in vacuo to form a red oil. This product was purified by means of a Craig countercurrent distribution in a solvent system composed of 60% aqueous methanol and toluene in a 1 to 1 ratio. The fractions containing the antibiotic activity were concentrated in vacuo to form a tan hygroscopic solid of approximately 70% purity, but having a high order of antifungal activity.

EXAMPLE II

A larger scale fermentation was conducted in accordance with the procedure of Example I and 150 gallons of the whole broth resulting from this fermentation was acidified to pH 2.5 and filtered. The filtrate was then extracted with an equal volume of chloroform. The solvent extract was concentrated to a volume of 1.5 liters and chromatographed on a column of acid-washed alumina (1100 ml.). The column was developed with chloroform (500 ml.) followed by 2.5% methanol in chloroform (3 liters). Four one liter filtrate fractions were collected; the third fraction of the column contained the bulk of the antibiotic and was evaporated to dryness. The residue (38 g. red-brown oil) was dissolved in ether (600 ml.) and treated dropwise with a solution of benzylamine (38 ml.) in ether (250 ml.). The resulting insoluble benzylamine salt of P.A. 132 was recovered by filtration and dried. Pigmented impurities were removed by leaching with 300 ml. of ethyl acetate-ether (1:9) yielding a buff-colored product, 31.5 g., M.P. 113–120° C., $[\alpha]_D$ −112° (c., 1% methanol).

EXAMPLE III

A solution of the P.A. 132 benzylamine salt (0.36 g.) prepared in accordance with Example II, in 1:1 methanol-water (20 ml.) was adjusted to pH 2.5 and extracted with ether (60 ml.). Evaporation of the ether extract gave a buff-colored solid residue (0.28 g.), which was found to be purified P.A. 132 free acid having the characteristics previously set forth in the specification.

EXAMPLE IV

An ether solution (25 ml.) of purified P.A. 132 free acid (0.47 g.) was treated with benzylamine (one mole equivalent) in ether (0.18 g.). The resulting precipitate was recovered by filtration. The material (0.47 g) was recrystallized from ethyl acetate-hexane, M.P. 122–125° $[\alpha]_D$ −122° (c., 1% methanol). Analyses: Found C, 67.88; H, 7.00; N, 3.48; neutral equivalent 373.

EXAMPLE V

The triethylamine salt of P.A. 132 was prepared in the same manner prescribed for the benzylamine salt and was found to have a melting point of 219–221° C.

The activity of antibiotic P.A. 132 in vivo against various plant pathogens was demonstrated in a series of foliage tests in which tomato and bean plants were treated with the antibiotic which had been incorporated at various concentrations in aqueous sprays. After the spray was dried each of the plants was bruised lightly on selected leaves with a pointed instrument which provided 100 receptor sites for possible infection. Thereafter, a broth culture of the pathogenic test organism was atomized on all plants until the leaves were thoroughly wetted, thereby subjecting each of the receptor sites to infection. Seven days later these plants were examined for infection on the injured leaves to determine the degree of infection as evidenced by the appearance of characteristic spots at the receptor sites. Controls were also run for the purpose of determining the degree of control produced by the antibiotic. The average percentage of infection and the percentage control of infection was then determined for the leaves of each plant under treatment.

In one of these tests, *Alternaria solani*, a fungus responsible for the early blight of tomatoes, was used as the test organism. The results of this test against a crude P.A. 132 preparation, i.e. freeze dried P.A. 132 fermentation broth, are set forth in the following table.

TABLE V

*In Vivo Activity of P.A. 132 Against Early Blight of Tomato*

| Antibiotic Concentration,[1] p.p.m. | 2,500 | 2,000 | 500 |
|---|---|---|---|
| Percent Control | 94 | 76 | 58 |

[1] In the form of freeze dried broth.

In like manner, the activity of the benzylamine salt of P.A. 132 was determined, and the results of this test are set forth in Table VI.

TABLE VI

In Vivo Activity of P.A. 132 Benzylamine Salt Against Early Blight of Tomato

| Antibiotic Concentration, p.p.m. | 80 | 16 |
|---|---|---|
| Percent Control | 61 | 33 |

In still another test *Erysiphe polygoni*, a fungus responsible for mildew of beans, was used as the test organism. The results of this test are set forth in Table VII.

TABLE VII

In Vivo Activity of P.A. 132 Benzylamine Salt Against Mildew of Beans

| Antibiotic Concentration, p.p.m. | 400 | 80 | 16 |
|---|---|---|---|
| Percent Control | 100 | 100 | 100 |

As shown in Table VII, the benzylamine salt of P.A. 132 exhibited a high order of activity against the organism responsible for the mildew of beans, achieving complete control of the infection with as little as 16 p.p.m. of the antibiotic.

While P.A. 132 and/or its various salts may be used as such in combating various phytopathogens, it is advantageous in some circumstances to incorporate the same with carriers and/or diluents to facilitate application of the antibiotic in control of plant disease. In particular, the agents of this invention may be prepared in the form of sprays, emulsions, dusting powders, concentrates and the like wherein the active ingredient may range from less than 1% to as high as 95% by weight of the compositions. These preparations may be applied directly to the foliage of the plants it is desired to protect; in some instances they may be applied to the soil; and they may also be applied to seeds to protect the same against phytopathogens sensitive to P.A. 132.

In certain preparations, as when aqueous sprays are desired, these compositions may contain a suitable wetting agent, preferably non-ionic wetting agents in powder form, and a compatible buffering agent to maintain the pH of the final spray solution at the desired level, say below about 7, thereby stabilizing the same. In preparing powders or concentrates, it is preferred to employ inert, non-absorbent carriers to facilitate proper proportioning of the ingredients and to prevent moisture absorption by the antibiotic. Suitable carriers include pyrophilite (an aluminum silicate sold under the trademark "Pyrax ABB"), bentonite, talc, kaolin, barden clay, perry clay, diatomaceous earth and the like. The antibiotic may also be suspended or dissolved in waxes, resins, particularly the natural resins or gums, and it may also be incorporated in a variety of other carriers, including those frequently employed in conjunction with agricultural pesticides. Such compositions may contain stabilizers, spreading agents, other anti-fungal and antibacterial agents, and in some instances, even insecticides.

The amount and concentration of the antibiotic to be employed against a particular disease, or to be employed for general disease control will, of course, vary considerably. The type of plant or tree, the type of disease involved, the time of year, weather conditions and the stage of development of the plant or tree are among the many factors which are to be considered in this respect. In general, however, effective control of phytopathogens sensitive to P.A. 132 and/or its salts is achieved by applying the antibiotic to the habitat of the pathogen in concentrations of from about 10 to 500 p.p.m. The use of concentrates is especially advantageous in providing compositions which are readily diluted with water or other diluents to form sprays or compositions containing the antibiotic in approximately the concentration set forth.

What is claimed is:

1. A process for producing antibiotic P.A. 132, which comprises cultivating *Streptomyces roseogriseus* in an aqueous nutrient medium containing a carbohydrate source and a source of organic nitrogen, under submerged aerobic conditions until substantial antimicrobial activity is imparted to said medium.

2. A process as claimed in claim 1 wherein the antibiotic P.A. 132 is recovered from the fermentation broth.

3. A process for producing P.A. 132 which comprises cultivation of *S. roseogriseus* in an aqueous nutrient medium containing a carbohydrate source and a source of organic nitrogen, under agitated submerged aerobic conditions at a temperature from about 24° to about 30° C., for a period from about one day to about four days.

4. A substance effective in inhibiting the growth of fungi, selected from the group consisting of a white, acidic substance moderately soluble in water, very soluble in methanol, ethanol, acetone, butanol and carbon tetrachloride, insoluble in hexane, having the optical rotation $\alpha_D^{25} = -161°$ (c. 1%, methanol), and capable of forming salts with organic bases; which contains the elements carbon, hydrogen and oxygen in substantially the following percentages by weight:

| | |
|---|---|
| Carbon | 64.67 |
| Hydrogen | 6.29 |
| Oxygen (by difference) | 29.04 | which displays in methanol a single peak at around 218.5 mμ

$$E_{1\,cm.}^{1\%} \ 358$$

in the ultraviolet region of the spectrum, and when dissolved in carbontetrachloride exhibits characteristic absorption in the infrared region at the following frequencies expresed in reciprocal centimeters: 2857, 1764, 1684, 1629, 1484, 1445, 1397, 1316, 1263, 1176, 1143, 1119, 1079, 1034, 952, 930, 921, 834, 737, 673; and the amine salts of said acidic substance.

5. A white acidic substance effective in inhibiting the growth of fungi and capable of forming salts with organic bases; which acidic substance is moderately soluble in water, very soluble in methanol, ethanol, acetone, butanol and carbon tetrachloride, insoluble in hexane, having the optical rotation $\alpha_D^{25} = -161°$ (c. 1%, methanol), which contains the elements carbon, hydrogen and oxygen in substantially the following percentages by weight:

| | |
|---|---|
| Carbon | 64.67 |
| Hydrogen | 6.29 |
| Oxygen (by difference) | 29.04 | which displays in methanol a single peak at around 218.5 mμ

$$E_{1\,cm.}^{1\%} \ 358$$

in the ultraviolet region of the spectrum, and when dissolved in carbontetrachloride exhibits characteristic absorption in the infrared region at the following frequencies expressed in reciprocal centimeters: 2857, 1764, 1629, 1484, 1445, 1397, 1316, 1263, 1176, 1143, 1119, 1079, 1034, 952, 930, 921, 834, 737, 673.

6. An amine salt of the acidic substance defined in claim 5.

7. A benzylamine salt of the acidic substance defined in claim 5.

8. A triethylamine salt of the acidic substance defined in claim 5.

9. A composition useful in combating fungi, comprising an inert carrier and as the essential active ingredient, from about 1 to 95% of an antimicrobial agent selected from the group consisting of the acidic substance defined in claim 5 and amine salts of said acidic substance.

References Cited in the file of this patent

UNITED STATES PATENTS 2,649,401    Haines et al. _____ Aug. 18, 1953

(Other references on following page)

OTHER REFERENCES

Waksman et al.: The Actinomycetes and Their Antibiotics, pages 10–16; 24–26; 176–178; 180; 182–184, 1953.

Smith et al.: Antibiotics and Chemotherapy, September 1954, p. 962.

Stevenson: Nature, Sept. 25, 1954, pages 598–599.

Waksman: Bacteriological Reviews, vol. 21, 1957, page 5.

Pridham et al.: Applied Microbiology, January 1958, pp. 52–79.

J. Bacteriology, pages 3 and 4, January 1956.

Bergey's Manual of Determinative Bacteriology, 1948, pages 47 and 48.

Williams Review of Scientific Instruments, March 1948, p. 142.

Alexopoulos: Ohio J. of Science, 1941, pages 425–429.